(No Model.) 2 Sheets—Sheet 1.

H. RÖHL & H. USEDOM.
APPARATUS FOR REMOVING BUTTER, &c.

No. 604,124. Patented May 17, 1898.

(No Model.) 2 Sheets—Sheet 2.
H. RÖHL & H. USEDOM.
APPARATUS FOR REMOVING BUTTER, &c.
No. 604,124. Patented May 17, 1898.
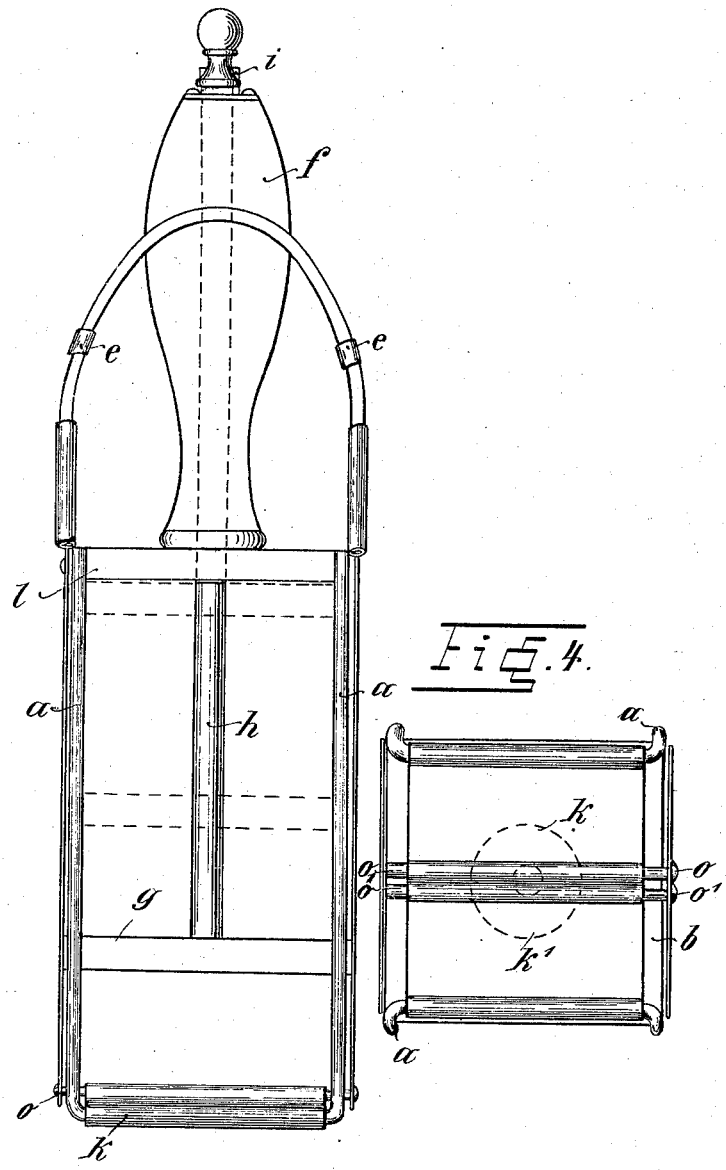

UNITED STATES PATENT OFFICE.

HERMANN RÖHL AND HELLMUTH USEDOM, OF NEUBRANDENBURG, GERMANY.

APPARATUS FOR REMOVING BUTTER, &c.

SPECIFICATION forming part of Letters Patent No. 604,124, dated May 17, 1898.

Application filed July 19, 1897. Serial No. 645,111. (No model.)

*To all whom it may concern:*

Be it known that we, HERMANN RÖHL and HELLMUTH USEDOM, of Neubrandenburg, in the Grand Duchy of Mecklenburg-Strelitz, in the German Empire, have invented an Apparatus for Removing Various Substances, Particularly those of a Fatty Nature, of which the following is a specification, reference being had therein to the accompanying drawings.

The object of the present application for Letters Patent consists of apparatus for taking up and separating quantities of groceries and other divisible materials whereby the quantity of goods taken up by the mechanism is approximately determined according to its weight and of the whole apparatus is easily and conveniently controlled.

Figure 1:
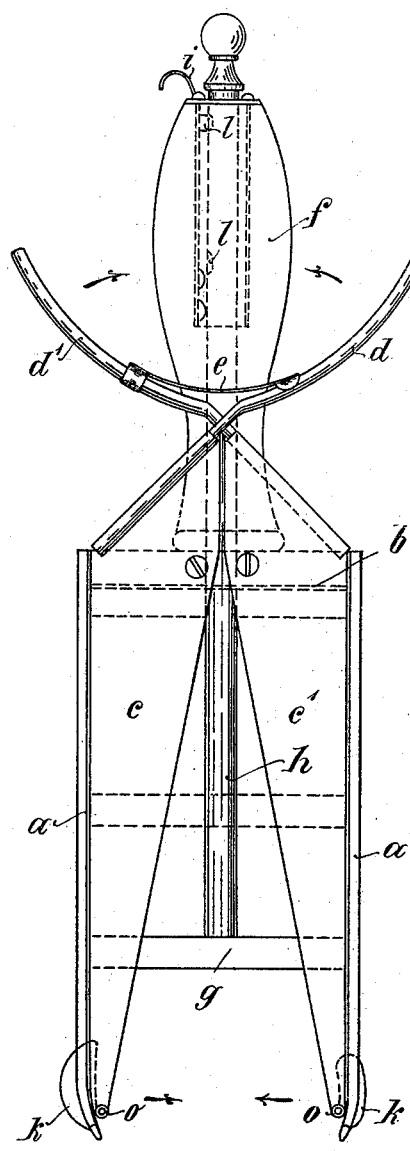
Figure 2:
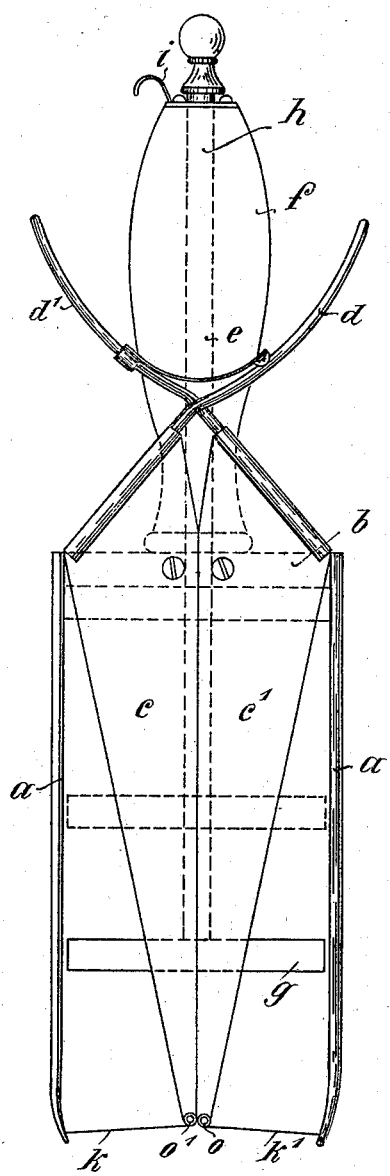

In the accompanying drawings the invention is illustrated as follows:

Figure 1 shows a side view of the apparatus open; Fig. 2, a side view thereof closed; Fig. 3, a front view of the apparatus; Fig. 4, a view of the apparatus from below.

The apparatus consists, essentially, of two clips $c$ $c'$, revolubly adjusted between a frame $a$ to the covering-plate $b$ of the same, which clips can be brought together or removed from each other by means of two wire loops $d$ $d'$, fixed to them and having between them a blade-spring $e$. Through the handle $f$, affixed to the covering-plate, there passes a stamp which consists of a bar $h$, provided at its end with a plate $g$, which is furnished with inwardly-projecting pieces $l$, in which a spring $i$, fixed to the handle, engages, whereby the stamp can be adjusted to various heights.

A further element of the apparatus consists of the connecting-bands $kk'$, which are formed of a folding material—such as waxed cloth, leather, bladder, or sheet metal—and one end of which is secured to the ends of the frame $a$ and the other ends of which are secured to the points of the clips $c$ $c'$.

When the apparatus is opened, as shown in Fig. 1, it can be pushed into the goods to be removed—such as butter, lard, soft soap, or blacking—so far as the stamp in its adjusted position will admit and so that the space below the said stamp is filled by the mass in question. It is advisable that the whole frame be provided with complete side walls. The apparatus is then closed by pressing together the two loops $d$ $d'$, causing the clips $c$ $c'$ to close, as shown in Fig. 2, and the connecting-bands $kk'$, which at the same time effect the removal of the goods, to be stretched apart. (See Fig. 4.) The apparatus can then be withdrawn from the mass, and the substance taken up by the same which has been approximately determined in weight can be removed from the apparatus, which is effected by simply opening the clips, it being possible by the adjustment of the stamp to secure an approximately fixed weight of the mass in question, for which purpose a graduated scale may be added to the apparatus.

The use of the apparatus will secure invariably an approximately equal fixed quantity of goods, whereby special weighing and addition to or subtraction from the amount taken is obviated, thus securing a special advantage for this machine.

What we claim, and desire to secure by Letters Patent of the United States, is—

1. In combination, the frame, the pivoted clips movable transversely across opposite sides thereof, and flexible sheets of the full width of the frame connecting the ends of the clips with said frame, substantially as described.

2. In combination, the frame comprising the oppositely-arranged side pieces and the connecting-head, the pairs of clips pivoted to opposite sides of said head each pair having a tong-like movement, the adjustable stamp, and the flexible sheets connecting the end of each clip with the lower edge of the adjacent side piece, said sheets forming a supporting-bottom to said frame when said clips are open, substantially as described.

3. In combination the sides $c$, $c'$, having a tong movement, the loops $d$, $d'$ fixed thereto, the cross-pieces $o$, $o'$ carried by the clips and the connecting-sheets K, K', fixed to said cross-pieces.

4. In combination, the frame, the sides thereof having their lower ends inwardly curved and tapered and the pivoted side pieces tapered toward their lower ends, said ends when said pieces are open being adapted to lie against said side frames at the curve thereof in the vertical plane of and above said ends, substantially as described.

5. In combination, the pivoted pieces having a tong movement, and the portions secured between said frame and said pivoted pieces forming complete bottom supports for the material held between said frames, substantially as described.

In witness whereof we have hereunto set our hands in presence of two witnesses.

HERMANN RÖHL.
HELLMUTH USEDOM.

Witnesses:
CONRAD PLOTZ,
GUSTAV STUNKEL.